US012379276B1

(12) United States Patent
Jung et al.

(10) Patent No.: US 12,379,276 B1
(45) Date of Patent: Aug. 5, 2025

(54) MULTI-COMPONENT FORCE LOAD CELL CALIBRATION DEVICE

(71) Applicant: AGENCY FOR DEFENSE DEVELOPMENT, Daejeon (KR)

(72) Inventors: Chi Hoon Jung, Daejeon (KR); Hwan Gyu Lee, Daejeon (KR); Young Hwa Kwon, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 19/205,477

(22) Filed: May 12, 2025

(30) Foreign Application Priority Data

May 13, 2024 (KR) .................. 10-2024-0062485

(51) Int. Cl.
 *G01L 25/00* (2006.01)
(52) U.S. Cl.
 CPC .................... *G01L 25/00* (2013.01)
(58) Field of Classification Search
 CPC ..... G01L 25/006; G01L 5/226; G01L 1/2206; G01L 1/2262; G01L 5/08; G01L 1/26; G01L 5/0066; G01L 25/00; G01L 5/133; G01L 5/16; G01L 5/12; G01N 3/62; G01N 3/08; G01G 23/3728; G01G 3/14023; G01G 23/012; G01G 23/01; G01G 19/02; G01G 17/04; G01G 3/13
 USPC .................................... 73/293, 1.15
 See application file for complete search history.

(56) References Cited

U.S. PATENT DOCUMENTS

2002/0092348 A1\* 7/2002 Ulman ................. G01M 9/062
  73/147

FOREIGN PATENT DOCUMENTS

| CN | 104280187 A | \* | 1/2015 | |
| CN | 117906842 A | \* | 4/2024 | ........... G01L 25/003 |
| JP | 2019-060863 A | | 4/2019 | |
| KR | 10-1999-0010054 | | 2/1999 | |
| KR | 10-0202276 B1 | | 6/1999 | |
| KR | 10-0343020 B1 | | 9/2002 | |
| KR | 10-0679138 B1 | | 2/2007 | |
| KR | 10-2009-0052094 A | | 5/2009 | |
| KR | 10-2184183 B1 | | 11/2020 | |
| KR | 10-2365115 B1 | | 2/2022 | |

\* cited by examiner

*Primary Examiner* — Brandi N Hopkins
(74) *Attorney, Agent, or Firm* — HESLIN ROTHENBERG FARLEY & MESITI P.C.

(57) ABSTRACT

A multi-component load cell calibration device includes a base plate, a first pillar and a second pillar disposed on the base plate, a third pillar connecting the first pillar and the second pillar, a rotation table, a first pulley, a second pulley, a third pulley, a fourth pulley, a load cell adapter in which the first pulley and the second pulley are arranged, a pulley pillar in which the third pulley and the fourth pulley are arranged, a wire cable wound around at least one pulley, a first actuator that applies a load to the wire cable, a wire bracket connected to the wire cable, and a second actuator that applies a load to the pulley pillar.

9 Claims, 7 Drawing Sheets

MULTI-COMPONENT FORCE LOAD CELL CALIBRATION DEVICE

CROSS-REFERENCE TO RELATED APPLICATION

This application claims the benefit of Korean Patent Application No. 10-2024-0062485 filed on May 13, 2024, in the Korean Intellectual Property Office, the entire disclosure of which is incorporated herein by reference for all purposes.

BACKGROUND

1. Field of the Invention

The disclosure relates to a device for calibrating a load cell, for example, a device that calibrates measurement results of a multi-component load cell by generating force or moment required by a user in the multi-component load cell using a calibration load.

2. Description of the Related Art

A load cell is an electrical sensor used to measure a load. A load cell is used to measure a load applied to a test subject in various experiments and evaluate the experimental results. Depending on the nature of an experiment, a load cell that measures a unidirectional load and a load cell that measures a multidirectional load are used. For the precision of the experiment and the reliability of the data measured through the load cell, a process of periodically calibrating the load cell may be necessary. To this end, various types of load cell calibration devices are being developed and used. For example, Korean Patent Application No. 10-1999-0010054 discloses a six-component force/moment calibrator that generates a six-component force using a force generating device and a moment generating device.

The above description has been possessed or acquired by the inventor(s) in the course of conceiving the present disclosure and is not necessarily an art publicly known before the present application is filed.

SUMMARY

An aspect of the disclosure provides a multi-component load cell calibration device capable of component force calibration in all directions.

According to an aspect, there is provided a multi-component load cell calibration device that includes a base plate, a first pillar vertically coupled to the base plate, a second pillar vertically coupled to the base plate, a third pillar connecting the first pillar and the second pillar and disposed parallel to the base plate, a rotation table disposed on the base plate and configured to support a multi-component load cell and rotate about an axis defined in the multi-component load cell, a load cell adapter disposed above the rotation table and configured to contact the multi-component load cell and rotate about a rotation axis that coincides with the axis of the multi-component load cell, a pulley pillar coupled to the load cell adapter and configured to maintain a fixed state when at least one of the rotation table or the load cell adapter is rotated, a first pulley disposed on the load cell adapter, a second pulley disposed on the load cell adapter and disposed symmetrically with the first pulley with respect to the rotation axis and configured to be interlocked with the first pulley, a third pulley disposed on the pulley pillar, a fourth pulley disposed on the pulley pillar to be symmetrical with the third pulley with respect to the rotation axis, a wire cable wound around at least one of the first pulley, the second pulley, the third pulley, and the fourth pulley, a first actuator disposed on the first pillar and configured to move along the first pillar, the first actuator being connected to the wire cable and configured to apply a load to the wire cable in a predetermined direction in a predetermined plane orthogonal to the rotation axis, a wire bracket disposed on the second pillar and configured to move along the second pillar, and connectable to the wire cable, and a second actuator coupled to the third pillar and configured to apply a load to the pulley pillar in an axial direction of the rotation axis.

The wire cable may be configured to take the form of at least one of a first form in which the wire cable is wound around the third pulley and the fourth pulley and connected to the first actuator and the wire bracket in a first mode, a second form in which the wire cable is wound around the third pulley and connected to the first actuator in a second mode, and a third form in which the wire cable is wound around the first pulley and the second pulley and connected to the first actuator and the wire bracket in a third mode.

The multi-component load cell calibration device may include a first load cell coupled to the first actuator and may be configured to measure a component in the same direction as a direction of the load applied to the wire cable by the first actuator among components comprising the load applied to the wire cable by the first actuator, and a second load cell coupled to the second actuator and configured to measure a component in the axial direction of the rotation axis among components making up the load applied to the pulley pillar by the second actuator.

A vertical distance from the base plate to the third pulley and a vertical distance from the base plate to the fourth pulley may be different from each other.

The third pulley and the fourth pulley may be arranged with a horizontal gap therebetween with respect to each other.

The pulley pillar may include a wire slit configured to allow the wire cable to pass through.

The multi-component load cell calibration device may include a bearing structure coupled between the load cell adapter and the pulley pillar and configured to allow the pulley pillar to maintain a fixed state with respect to the load cell adapter when at least one of the rotation table or the load cell adapter rotates.

The bearing structure may include a first hole and a second hole, and the first hole and the second hole may be arranged to be symmetrical to each other with respect to the rotation axis.

The first hole and the second hole may be arranged such that the wire cable that is wound around the first pulley and the second pulley and passes through the first hole and the second hole extends in a predetermined direction above the load cell adapter.

According to an embodiment, the multi-component load cell calibration device may continuously implement calibration loads in all directions. The effects of the multi-component load cell calibration device according to an embodiment are not limited to those mentioned above, and other effects not mentioned will be clearly understood by those skilled in the art from the description below.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
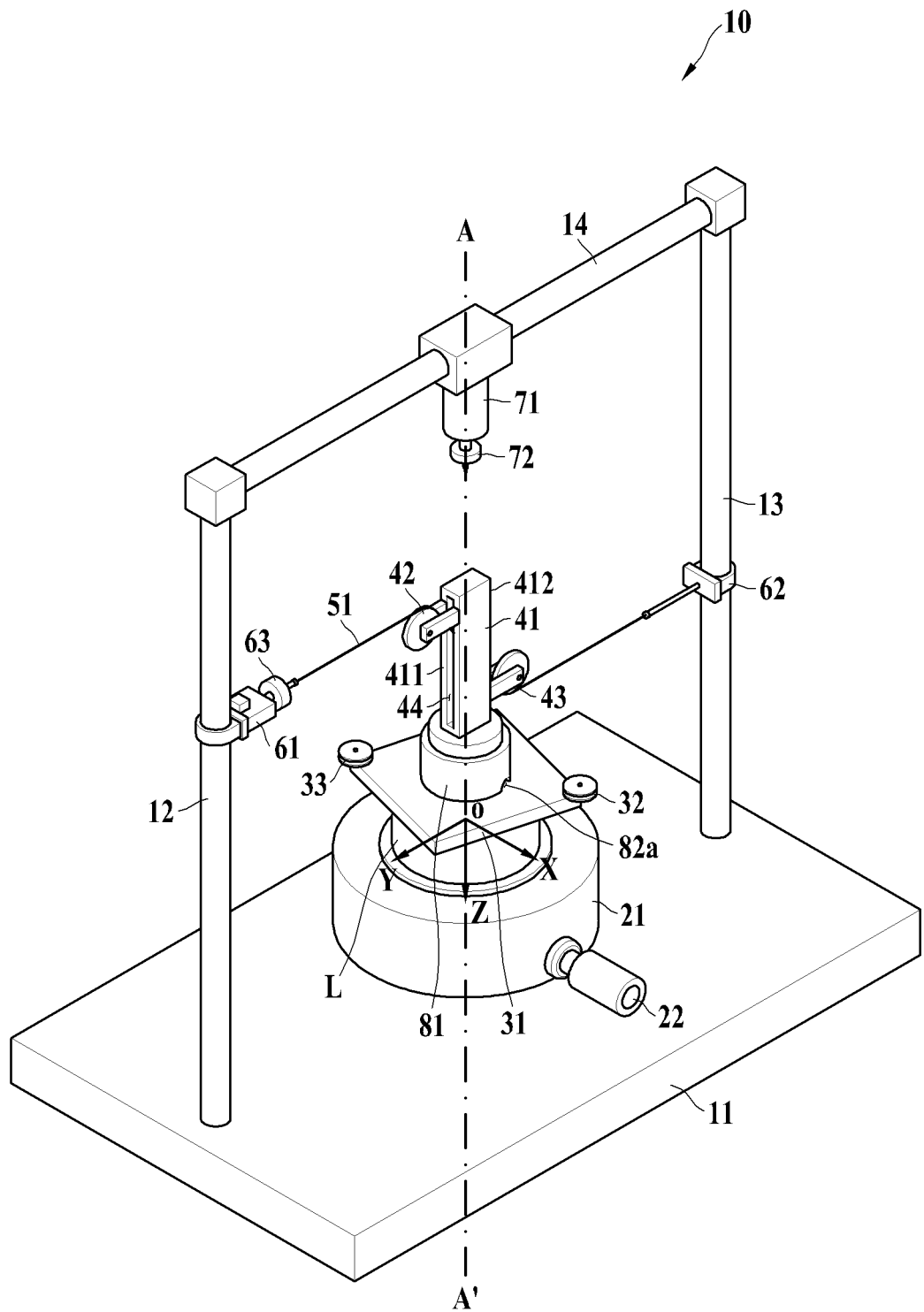
FIG. 1 is a perspective view of a multi-component load cell calibration device according to an embodiment.

Hereinafter, embodiments will be described in detail with reference to the accompanying drawings. However, since various modifications may be made to the embodiments, the embodiments are not meant to be limited, but it is intended that various modifications, equivalents, and alternatives are also covered within the scope of the claims.

The terms used in the embodiments are for illustrative purposes only and should not be construed as limiting. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

In addition, when explaining with reference to the attached drawings, identical components are given the same reference numerals regardless of the drawing numbers, and redundant descriptions thereof are omitted. When describing an embodiment, if it is determined that a detailed description of a related known technology may unnecessarily obscure the gist of the embodiment, the detailed description is omitted.

In addition, terms such as first, second, A, B, (a), (b), and the like may be used herein to describe components. Each of these terminologies is not used to define an essence, order, or sequence of a corresponding component but used merely to distinguish the corresponding component from other component(s). When it is mentioned that one component is "connected", "coupled" or "accessed" to another component, it may be understood that the one component is directly connected or accessed to another component or that still other component is interposed between the two components.

Components included in an embodiment and components that include common functions will be described using the same names in other embodiments. Unless otherwise described, the description given in one embodiment may also be applied to other embodiments, and a repeated description related thereto will be omitted.

FIG. 1 is a perspective view of a multi-component load cell calibration device according to an embodiment.

Referring to FIG. 1, a multi-component load cell calibration device 10 may include a base plate 11, a first pillar 12, a second pillar 13, and a third pillar 14. The base plate 11 may have a flat top surface. The first pillar 12 may be coupled vertically to the base plate 11. The second pillar 13 may be coupled vertically to the base plate 11. The first pillar 12 and the second pillar 13 may be disposed on the top surface of the base plate 11. The third pillar 14 may connect the first pillar 12 and the second pillar 13. The third pillar 14 may be disposed parallel to the base plate 11.

A multi-component load cell L may measure a force in an axial direction of each axis and a moment about each axis in an XYZ orthogonal coordinate system including an X-axis, a Y-axis, and a Z-axis defined in the multi-component load cell L. The multi-component load cell calibration device 10 may generate a force in an axial direction of each axis and/or a moment about each axis in the multi-component load cell L to calibrate the force in the axial direction of each axis and/or the moment about each axis measured by the multi-component load cell L. The XYZ orthogonal coordinate system may be an orthogonal coordinate system having a load cell center O of the multi-component load cell L as the origin. A position of the load cell center O may be defined as a central point of a central axis of the multi-component load cell L. The position of the load cell center O may be defined differently for each multi-component load cell L depending on a force and/or moment measurement scheme and/or geometric shape of each multi-component load cell L. An axial direction of the Z-axis may be defined in a direction from the load cell center O toward a vertical downward direction. The X-axis and Y-axis may be defined as axes orthogonal to each other while being orthogonal to the Z-axis.

The multi-component load cell calibration device 10 may include a rotation table 21. The rotation table 21 may be configured to rotate about a rotation axis A-A' that coincides with the Z-axis defined in the multi-component load cell L. The rotation table 21 may be formed and disposed such that the rotation axis A-A' becomes the central axis. The rotation table 21 may be configured to support the multi-component load cell L. The multi-component load cell L supported by the rotation table 21 may rotate together when the rotation table 21 rotates. The rotation table 21 may be disposed on the top surface of the base plate 11. The first pillar 12 and the second pillar 13 may be disposed opposite to each other with respect to the rotation table 21 on the top surface of the base plate 11. The rotation table 21 may include a rotation actuator (not shown). The rotation actuator (not shown) may rotate the rotation table 21 about the rotation axis A-A'. The multi-component load cell calibration device 10 may include an encoder 22. The encoder 22 may be coupled to the rotation table 21. The encoder 22 may output information about the rotation of the rotation table 21 as an electrical signal.

The multi-component load cell calibration device 10 may include a load cell adapter 31. The load cell adapter 31 may be in contact with the multi-component load cell L supported by the rotation table 21. The load cell adapter 31 may be disposed above the multi-component load cell L supported by the rotation table 21. The load cell adapter 31 may be disposed such that the rotation axis A-A' becomes the central axis. The load cell adapter 31 may be configured to rotate about the rotation axis A-A'.

The multi-component load cell calibration device 10 may include a pulley pillar 41. The pulley pillar 41 may be vertically coupled to the load cell adapter 31. The pulley pillar 41 may be disposed above the load cell adapter 31. The pulley pillar 41 may be disposed such that the rotation axis A-A' becomes the central axis. The pulley pillar 41 may be configured to maintain a fixed state when at least one of the rotation table 21 or the load cell adapter 31 rotates.

The multi-component load cell calibration device 10 may include a bearing structure 81. The bearing structure 81 may be disposed such that the rotation axis A-A' becomes the central axis. The bearing structure 81 may be coupled between the load cell adapter 31 and the pulley pillar 41. The bearing structure 81 may have a cylindrical shape. The bearing structure 81 may be configured to allow the pulley pillar 41 to maintain a fixed state when at least one of the rotation table 21 or the load cell adapter 31 rotates.

The multi-component load cell calibration device 10 may include a first pulley 32 and a second pulley 33. The first pulley 32 may be disposed on a top surface of the load cell adapter 31. The second pulley 33 may be disposed on the top surface of the load cell adapter 31. The first pulley 32 and the second pulley 33 may arranged symmetrically with respect to the rotation axis A-A'. The first pulley 32 and the second pulley 33 may be configured to be interlocked with each other.

The multi-component load cell calibration device 10 may include a third pulley 42 and a fourth pulley 43. The third pulley 42 may be disposed on a first side 411 of the pulley pillar 41. The first side 411 may face the first pillar 12. The fourth pulley 43 may be disposed on a second side 412 of the pulley pillar 41 opposite to the first side 411. The second side 412 may face the second pillar 13. A vertical distance from the base plate 11 to the third pulley 42 may be different from a vertical distance from the base plate 11 to the fourth pulley 43. The vertical distance from the base plate 11 to the third pulley 42 may be greater than the vertical distance from the base plate 11 to the fourth pulley 43. The third pulley 42 and the fourth pulley 43 may be arranged symmetrically with respect to the rotation axis A-A'. The third pulley 42 and the fourth pulley 43 may be arranged with a horizontal gap G therebetween with respect to each other. The horizontal gap G may be formed in a direction perpendicular to the rotation axis A-A'.

Due to the accumulation of assembly tolerances of components of the multi-component load cell calibration device 10, a micro axis misalignment may occur in a wire cable 51, which may generate an undesired moment about the Z-axis. When the third pulley 42 and the fourth pulley 43 are arranged with the horizontal gap G therebetween, even when the micro axis misalignment occurs in the wire cable 51, the axis alignment of the wire cable 51 may be automatically achieved so that the undesired moment about the Z-axis is offset.

The multi-component load cell calibration device 10 may include the wire cable 51. The wire cable 51 may be wound around at least one of the first pulley 32, the second pulley 33, the third pulley 42, and the fourth pulley 43. The wire cable 51 may include a first end (not shown) and a second end (not shown). The first end (not shown) may be positioned opposite to the second end (not shown).

The bearing structure 81 may include a first hole 82a and a second hole 82b. The first hole 82a and the second hole 82b may be formed along a side surface of the bearing structure 81. The first hole 82a and the second hole 82b may be configured to allow the wire cable 51 to pass through. The first hole 82a and the second hole 82b may be arranged symmetrically with respect to the rotation axis A-A'. The first hole 82a and the second hole 82b may be arranged such that the wire cable 51 that is wound around the first pulley 32 and the second pulley 33 and passes through the first hole 82a and the second hole 82b extends in a predetermined direction above the load cell adapter 31.

The pulley pillar 41 may include a wire slit 44. The wire slit 44 may be formed to penetrate the pulley pillar 41 from the first side 411 to the second side 412. The wire slit 44 may be configured to allow the wire cable 51 wound around the third pulley 42 and the fourth pulley 43 to pass through.

The multi-component load cell calibration device 10 may include a first actuator 61. The first actuator 61 may be coupled to the first pillar 12. The first actuator 61 may be configured to move along the first pillar 12. The first actuator 61 may be configured to rotate about the first pillar 12. The first actuator 61 may apply a load to the wire cable 51 in a predetermined direction in a predetermined plane orthogonal to the rotation axis A-A'.

The multi-component load cell calibration device 10 may include a first load cell 63. The first load cell 63 may be coupled to the first actuator 61. The wire cable 51 may be connected to the first load cell 63. When the wire cable 51 is connected to the first load cell 63, the wire cable 51 may be disposed to extend in the same direction as a direction of a load applied to the wire cable 51 by the first actuator 61. The first load cell 63 may measure a component in the same direction as the direction of the load applied to the wire cable 51 by the first actuator 63 among components making up the load applied to the wire cable 51 by the first actuator 63.

The multi-component load cell calibration device 10 may include a wire bracket 62. The wire bracket 62 may be coupled to the second pillar 13. The wire cable 51 may be connected to the wire bracket 62. The wire bracket 62 may be configured to move along the second pillar 13. The wire bracket 62 may be configured to rotate about the second pillar 13.

The multi-component load cell calibration device 10 may include a second actuator 71. The second actuator 71 may be coupled to the third pillar 14. The second actuator 71 may be disposed at a point where the rotation axis A-A' and the third pillar 14 meet. The second actuator 71 may apply a load to the pulley pillar 41 in the axial direction of the rotation axis A-A'.

The multi-component load cell calibration device 10 may include a second load cell 72. The second load cell 72 may be coupled to the second actuator 71. The second load cell 72 may measure a component in the axial direction of the rotation axis A-A' of a load applied to the pulley pillar 41 by the second actuator 71.

Figure 2:
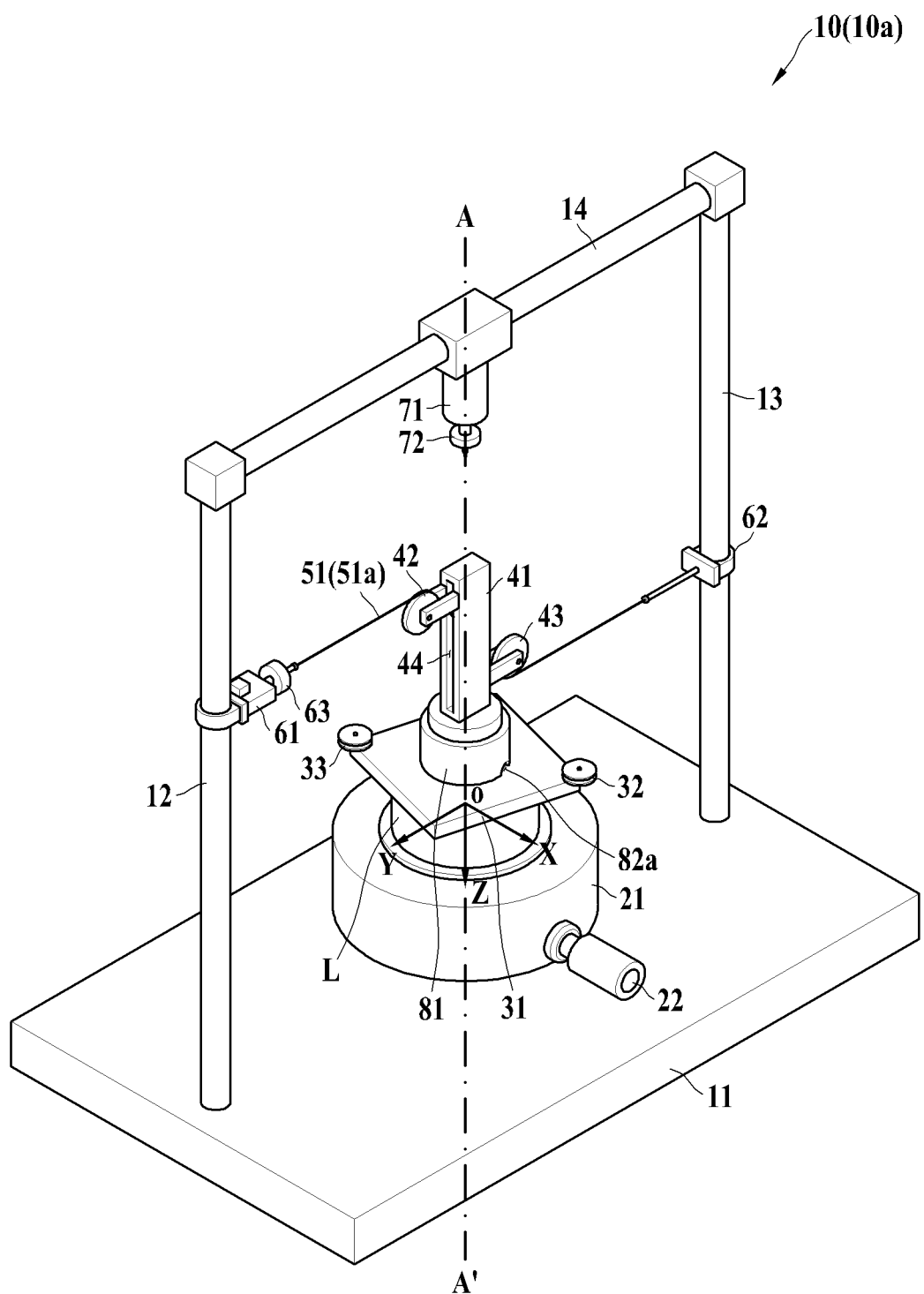
FIG. 2 is a perspective view of a first mode of the multi-component load cell calibration device according to an embodiment.
Figure 3:
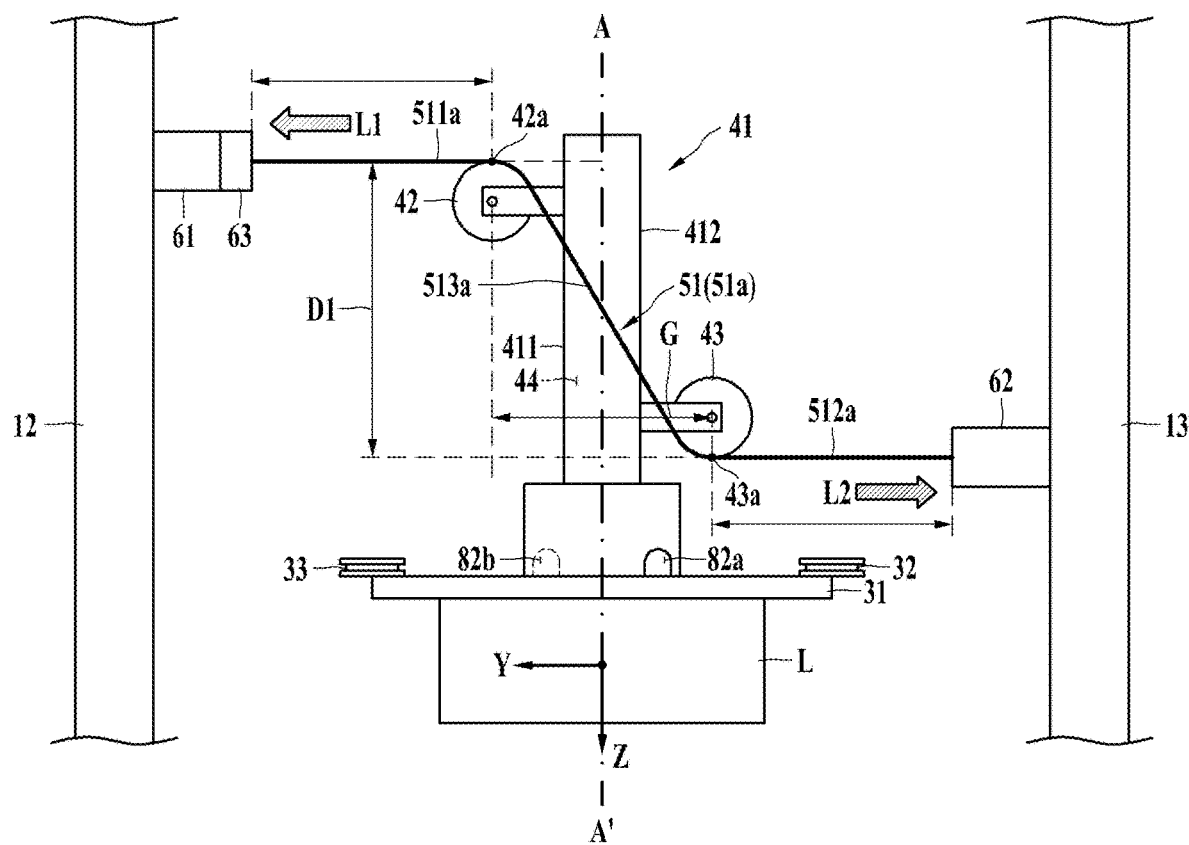
FIG. 3 is a front view of a portion of the first mode of the multi-component load cell calibration device according to an embodiment.

FIG. 2 is a perspective view of a first mode of the multi-component load cell calibration device according to an embodiment. FIG. 3 is a front view of a portion of the first mode of the multi-component load cell calibration device according to an embodiment.

Referring to FIGS. 2 and 3, the multi-component load cell calibration device 10 may operate in a first mode 10a. The first mode 10a may generate a pure moment about the X-axis or Y-axis and/or a force in a Z-axis direction in the multi-component load cell L. In the first mode 10a, the multi-component load cell calibration device 10 may generate a pure moment in the multi-component load cell L without directly applying a load to the multi-component load cell L to perform pure moment calibration on the multi-component load cell L.

In the first mode 10a, the wire cable 51 may take a first form 51a. In the first form 51a, the first end (not shown) of the wire cable 51 may be connected to the first load cell 63, and the second end (not shown) may be connected to the wire bracket 62. In the first form 51a, the wire cable 51 may be wound around the third pulley 42 and the fourth pulley 43.

The first form 51a of the wire cable 51 may include a first wire portion 511a that is a portion of the wire cable 51 from a first contact point 42a, which is a point at which the wire cable 51 started from the first load cell 63 initially contacts the third pulley 42, to the first load cell 63. The first form 51a of the wire cable 51 may include a second wire portion 512a that is a portion of the wire cable 51 from a second contact point 43a, which is a point at which the wire cable 51 started from the wire bracket 62 initially contacts the fourth pulley 43, to the wire bracket 62. The first actuator 61 may be disposed on the first pillar 12 such that the first wire portion 511a and the base plate 11 are parallel. The wire bracket 62 may be disposed on the second pillar 13 such that the second wire portion 512a and the base plate 11 are parallel.

In the first mode 10a, the first actuator 61 may apply a first load L1 to the wire cable 51 connected to the first load cell 63. The first load L1 may be a load that acts in a predetermined direction in a predetermined plane orthogonal to the rotation axis A-A'. The first actuator 61 may pull the wire cable 51 by applying the first load L1 to the wire cable 51.

Due to the first load L1 applied to the wire cable 51 by the first actuator 61, a second load L2 may be generated by reaction in a direction toward the wire bracket 62 connected to the wire cable 51. The magnitudes of the first load L1 and the second load L2 may be the same. Accordingly, the first load L1 and the second load L2 may be in a force couple relationship in which the magnitudes are the same and the directions are opposite. Therefore, although no force is applied to the multi-component load cell L, only a pure moment about a pivot point may be generated because the points of application of the first load L1 and the second load L2 are different. The pure moment generated here may be a moment about the X-axis or a moment about the Y-axis.

When the first load L1 is applied by the first actuator 61 while the rotation table 21 is rotated about the rotation axis A-A', a moment about the X-axis or a moment about the Y-axis may be generated in the multi-component load cell L with respect to all radial directions of the rotation axis A-A', thereby allowing calibration to be performed for the moment about the X-axis or the moment about the Y-axis measured by the multi-component load cell L. The moment generated in the first mode 10a may be calculated using a load measured by the first load cell 63 and a first moment arm D1, which may be defined as a vertical distance between extension lines of the first wire portion 511a and the second wire portion 512a.

In the first mode 10a, the first form 51a of the wire cable 51 may include a third wire portion 513a, which is a portion of the wire cable 51 from the first contact point 42a to the second contact point 43a. The third wire portion 513a may pass through the wire slit 44 of the pulley pillar 41. Due to the arrangement of the wire slit 44 and the wire cable 51 passing through the wire slit 44, the multi-component load cell calibration device 10 may generate a moment about the X-axis or a moment about the Y-axis in the multi-component load cell L with only the single wire cable 51 and may calibrate the moment about the X-axis or the moment about the Y-axis measured by the multi-component load cell L.

In the first mode 10a, the second actuator 71 may apply a load in the axial direction of the rotation axis A-A' to the pulley pillar 41. The load applied to the pulley pillar 41 by the second actuator 71 may be transmitted to the multi-component load cell L, and the force in the axial direction of the Z-axis measured by the multi-component load cell L may be calibrated.

Figure 4:
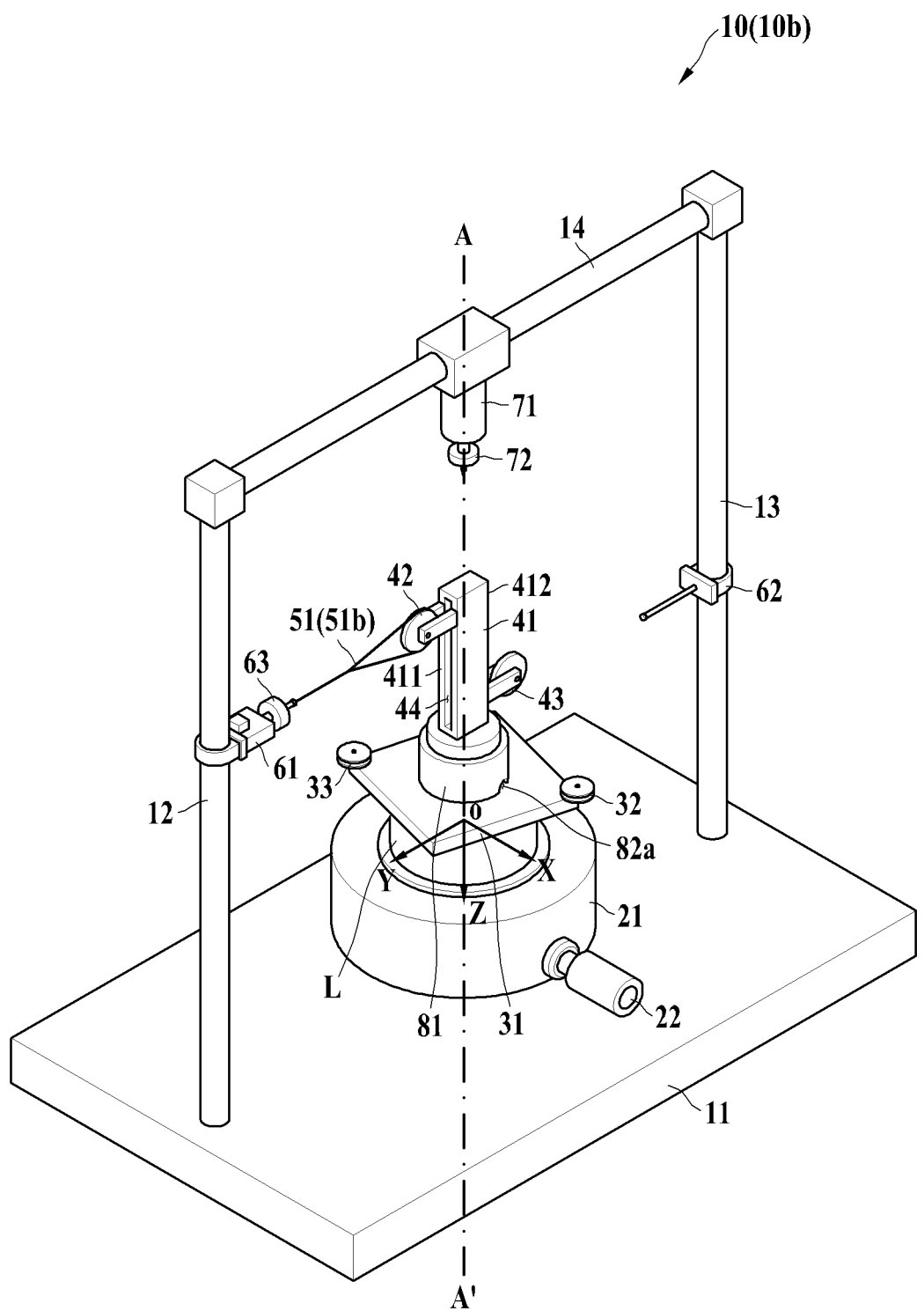
FIG. 4 is a perspective view of a second mode of the multi-component load cell calibration device according to an embodiment.
Figure 5:
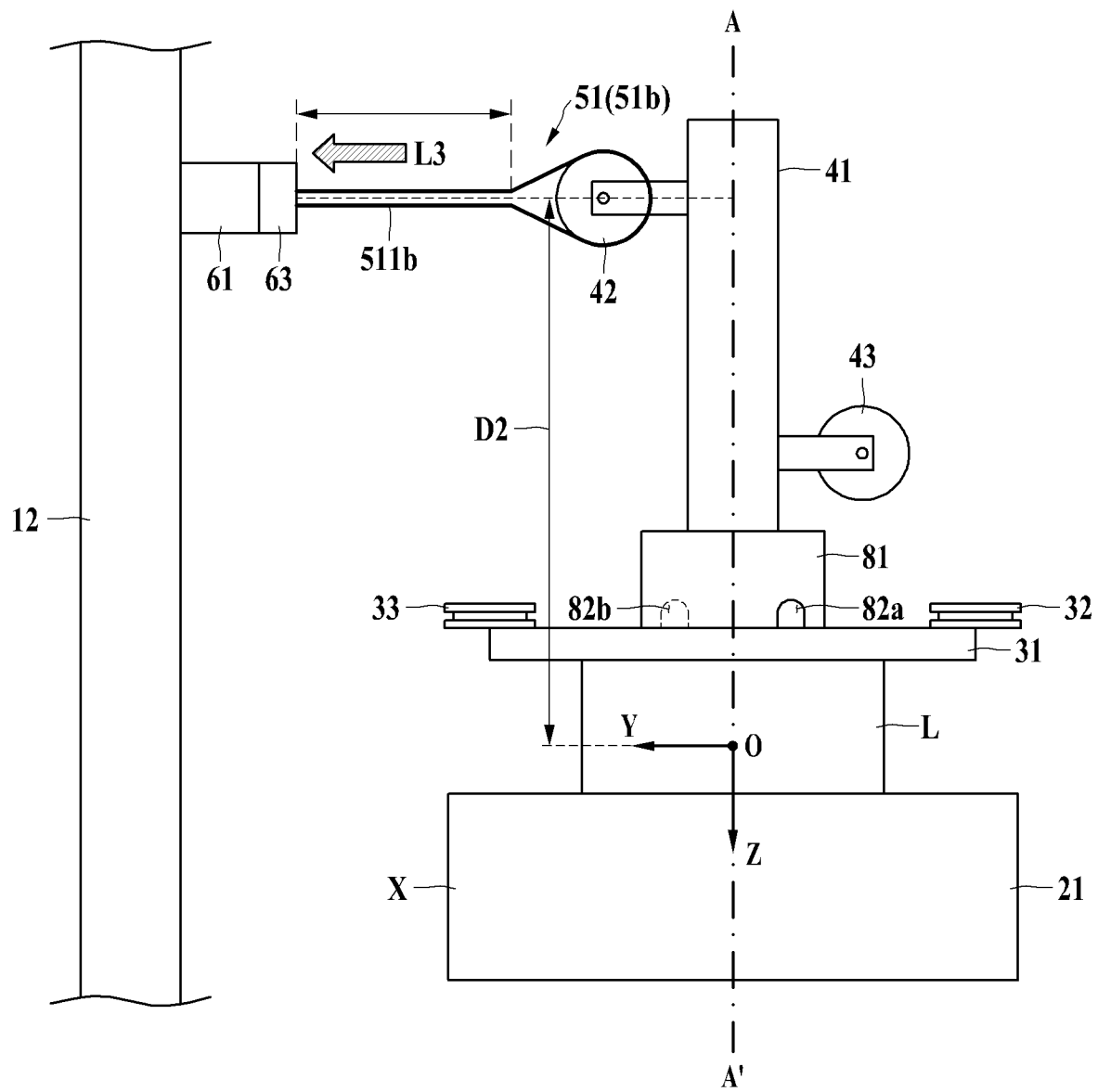
FIG. 5 is a front view of a portion of the second mode of the multi-component load cell calibration device according to an embodiment.

FIG. 4 is a perspective view of a second mode of the multi-component load cell calibration device according to an embodiment. FIG. 5 is a front view of a portion of the second mode of the multi-component load cell calibration device according to an embodiment.

Referring to FIGS. 4 and 5, the multi-component load cell calibration device 10 may operate in a second mode 10b. In the second mode 10b of the multi-component load cell calibration device 10, the wire cable 51 may take a second form 51b. In the second form 51b of the wire cable 51, both the first end (not shown) and the second end (not shown) of the wire cable 51 may be connected to the first load cell 63. In the second form 51b of the wire cable 51, the wire cable 51 may be wound around the third pulley 42. The second form 51b of the wire cable 51 may include a fourth wire portion 511b that is parallel to the base plate 11. The first actuator 61 may be disposed on the first pillar 12 such that the fourth wire portion 511b and the base plate 11 are parallel.

In the second mode 10b, the first actuator 61 may apply a third load L3 to the wire cable 51 connected to the first load cell 63. The third load L3 may be a load that acts in a predetermined direction in a predetermined plane orthogonal to the rotation axis A-A'. The first actuator 61 may pull the wire cable 51 by applying the third load L3 to the wire cable 51. The third load L3 may generate both a force in the axial direction of the X-axis and a moment about the Y-axis in the multi-component load cell L, or both a force in the axial direction of the Y-axis and a moment about the X-axis. By applying the third load L3 to the wire cable 51 by the first actuator 61 while rotating the rotation table 21 about the rotation axis A-A', both the force in the axial direction of the X-axis and the moment about the Y-axis may be generated in all radial directions of the Z-axis in the multi-component load cell L, or both a force in the axial direction of the Y-axis and a moment about the X-axis may be generated to calibrate the force and/or moment measured by the multi-component load cell L. The moment generated in the second mode 10b may be calculated using a load measured in the first load cell 63 and a second moment arm D2, which may be defined as a vertical distance between an extension line of the third wire portion 511b and the load cell center O.

Figure 6:
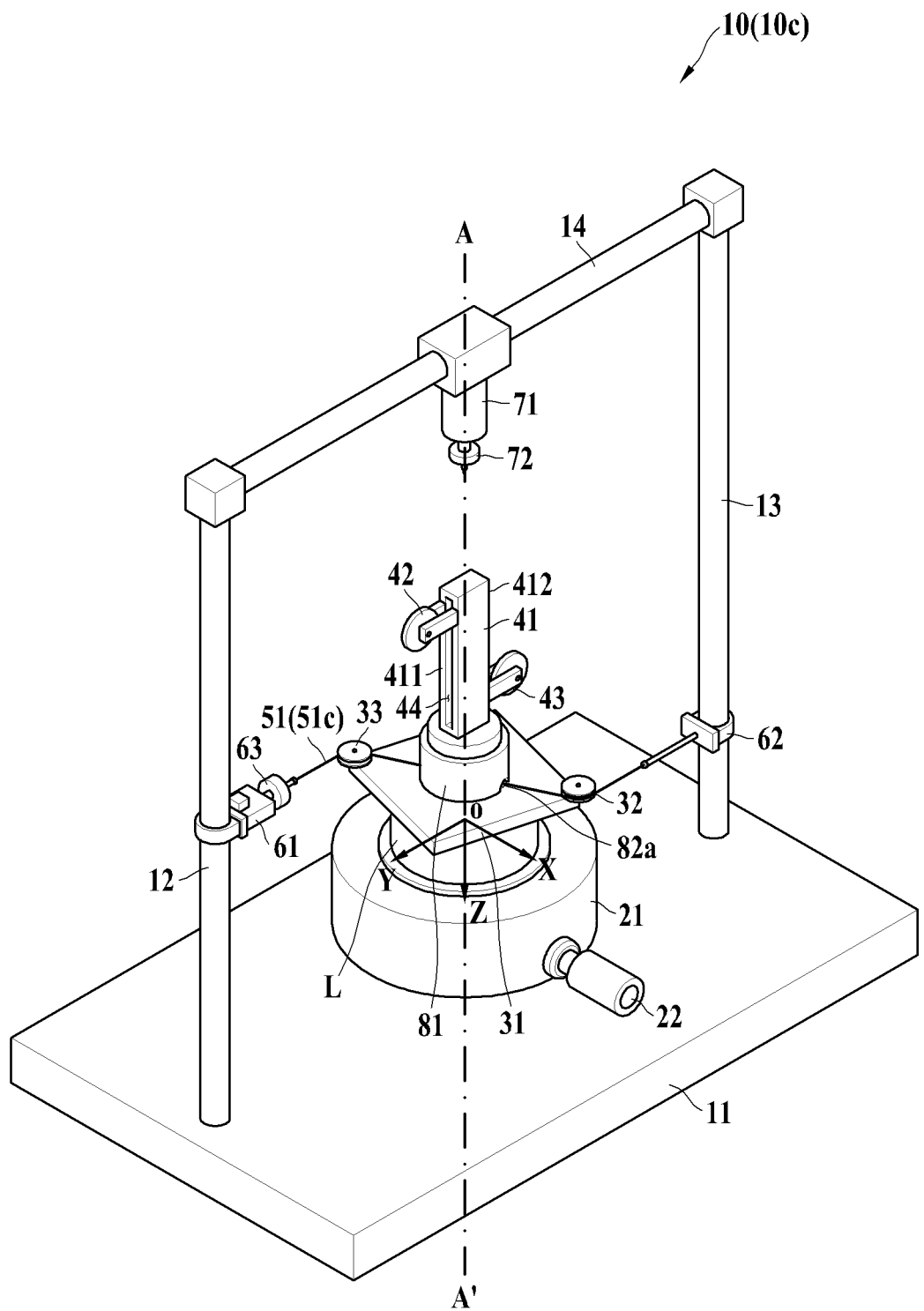
FIG. 6 is a perspective view of a third mode of the multi-component load cell calibration device according to an embodiment.
Figure 7:
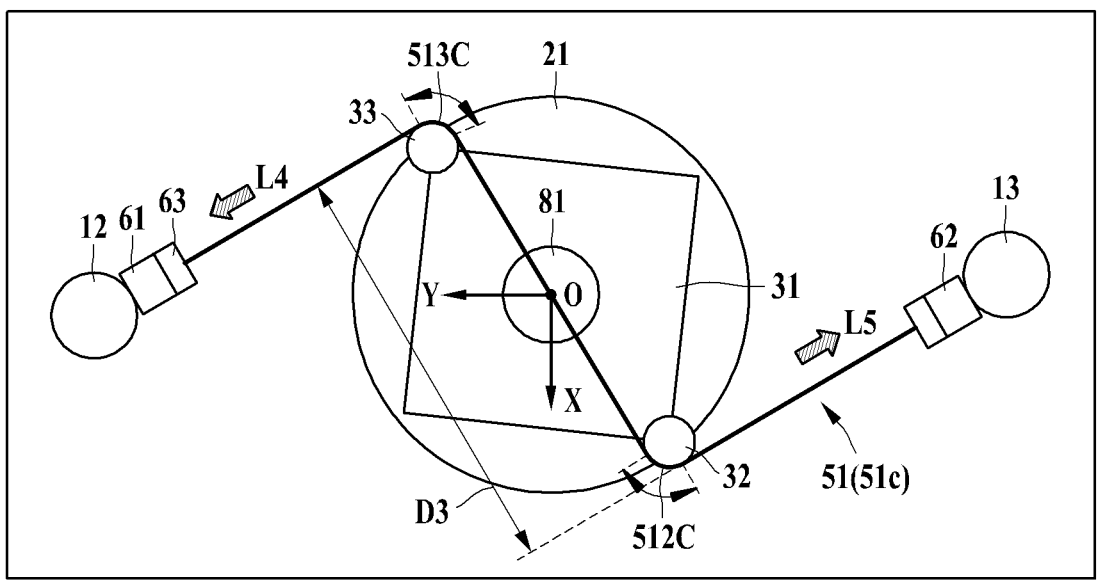
FIG. 7 is a plan view of a portion of the third mode of the multi-component load cell calibration device according to an embodiment.

FIG. 6 is a perspective view of a third mode of the multi-component load cell calibration device according to an embodiment. FIG. 7 is a plan view of a portion of the third mode of the multi-component load cell calibration device according to an embodiment.

Referring to FIGS. 6 and 7, the multi-component load cell calibration device 10 may operate in a third mode 10c. In the third mode 10c of the multi-component load cell calibration device 10, the wire cable 51 may take a third form 51c. In the third form 51c of the wire cable 51, a first end (not shown) of the wire cable 51 may be connected to the first load cell 63, and a second end (not shown) of the wire cable 51 may be connected to the wire bracket 62. In the third form 51c of the wire cable 51, the wire cable 51 may be wound around the first pulley 32 and the second pulley 33, disposed parallel to the base plate 11, and arranged to pass through the first hole 82a and the second hole 82b.

Due to the arrangement of the first hole 82a and the second hole 82b and the arrangement of the wire cable 51 passing through the first hole 82a and the second hole 82b, the multi-component load cell calibration device 10 may generate a moment about the Z-axis in the multi-component load cell L with only a single wire cable and may calibrate the moment about the Z-axis measured by the multi-component load cell L.

The third form 51c of the wire cable 51 may include a first contact area 512c where the wire cable 51 contacts the first pulley 32, and a second contact area 513c where the wire cable 51 contacts the second pulley 33. The remaining wire sections excluding the first contact area 512c and the second contact area 513c may form a right angle with an adjacent wire section.

In the third mode 10c of the multi-component load cell calibration device 10, the first actuator 61 may apply a fourth load L4 to the wire cable 51 connected to the first load cell 63. The fourth load L4 may be a load that acts in a predetermined direction in a predetermined plane orthogonal to the rotation axis A-A'. The first actuator 61 may pull the wire cable 51 by applying the fourth load L4 to the wire cable 51. Due to the fourth load L4 applied to the wire cable 51 by the first actuator 61, a fifth load L5 may be generated by reaction in a direction toward the wire bracket 62 connected to the wire cable 51. The magnitudes of the fourth load L4 and the fifth load L5 may be the same.

The fourth load L4 and the fifth load L5 may generate a pure moment about the Z-axis in the multi-component load cell L. In a state in which the rotation table 21 is fixed, the moment generated in the multi-component load cell L by the first actuator 61 may calibrate the moment about the Z-axis measured by the multi-component load cell L. The moment generated in the third mode 10c of the multi-component load cell calibration device 10 may be calculated using a load measured at the first load cell 63 and a third moment arm D3, which may be defined as a vertical distance between a wire section connected to the first load cell 63 and a wire section connected to the wire bracket 62.

In the second mode 10b and the third mode 10c, the second actuator 71 may apply a load to the pulley pillar 41 in the axial direction of the rotation axis A-A'. The load applied to the pulley pillar 41 by the second actuator 71 may be transmitted to the multi-component load cell L, and a force in the axial direction of the Z-axis measured by the multi-component load cell L may be calibrated.

Although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

What is claimed is:

1. A multi-component load cell calibration device, comprising:
    a base plate;
    a first pillar vertically coupled to the base plate;
    a second pillar vertically coupled to the base plate;
    a third pillar connecting the first pillar and the second pillar and disposed parallel to the base plate;
    a rotation table disposed on the base plate and configured to support a multi-component load cell and rotate about an axis defined in the multi-component load cell;
    a load cell adapter disposed above the rotation table and configured to contact the multi-component load cell and rotate about a rotation axis that coincides with the axis of the multi-component load cell;
    a pulley pillar coupled to the load cell adapter and configured to maintain a fixed state when at least one of the rotation table or the load cell adapter is rotated;
    a first pulley disposed on the load cell adapter;
    a second pulley disposed on the load cell adapter and disposed symmetrically with the first pulley with respect to the rotation axis and configured to be interlocked with the first pulley;
    a third pulley disposed on the pulley pillar;
    a fourth pulley disposed on the pulley pillar to be symmetrical with the third pulley with respect to the rotation axis;
    a wire cable wound around at least one of the first pulley, the second pulley, the third pulley, and the fourth pulley;
    a first actuator disposed on the first pillar and configured to move along the first pillar, the first actuator being connected to the wire cable and configured to apply a load to the wire cable in a predetermined direction in a predetermined plane orthogonal to the rotation axis;
    a wire bracket disposed on the second pillar and configured to move along the second pillar, and connectable to the wire cable; and
    a second actuator coupled to the third pillar and configured to apply a load to the pulley pillar in an axial direction of the rotation axis.

2. The multi-component load cell calibration device of claim 1, wherein the wire cable is configured to take the form of at least one of:
    a first form in which the wire cable is wound around the third pulley and the fourth pulley and connected to the first actuator and the wire bracket in a first mode;
    a second form in which the wire cable is wound around the third pulley and connected to the first actuator in a second mode; and
    a third form in which the wire cable is wound around the first pulley and the second pulley and connected to the first actuator and the wire bracket in a third mode.

3. The multi-component load cell calibration device of claim 1, further comprising:
    a first load cell coupled to the first actuator and configured to measure a component in the same direction as a direction of the load applied to the wire cable by the first actuator among components comprising the load applied to the wire cable by the first actuator; and
    a second load cell coupled to the second actuator and configured to measure a component in the axial direction of the rotation axis among components comprising the load applied to the pulley pillar by the second actuator.

4. The multi-component load cell calibration device of claim 1, wherein a vertical distance from the base plate to the third pulley and a vertical distance from the base plate to the fourth pulley are different from each other.

5. The multi-component load cell calibration device of claim 1, wherein the third pulley and the fourth pulley are arranged with a horizontal gap therebetween with respect to each other.

6. The multi-component load cell calibration device of claim 1, wherein the pulley pillar comprises a wire slit configured to allow the wire cable to pass through.

7. The multi-component load cell calibration device of claim 1, further comprising:
   a bearing structure coupled between the load cell adapter and the pulley pillar and configured to allow the pulley pillar to maintain a fixed state with respect to the load cell adapter when at least one of the rotation table or the load cell adapter rotates.

8. The multi-component load cell calibration device of claim 7, wherein the bearing structure comprises a first hole and a second hole, and
   the first hole and the second hole are arranged to be symmetrical to each other with respect to the rotation axis.

9. The multi-component load cell calibration device of claim 8, wherein the first hole and the second hole are arranged such that the wire cable that is wound around the first pulley and the second pulley and passes through the first hole and the second hole extends in a predetermined direction above the load cell adapter.

\* \* \* \* \*